United States Patent [19]
Connors et al.

[11] 3,837,415
[45] Sept. 24, 1974

[54] BULK WEIGHT SERVO CONTROL FOR PACKAGING MACHINES

[75] Inventors: Robert H. Connors, Chicago; King L. Klopfenstein, Prospect Heights, both of Ill.

[73] Assignee: Triangle Package Machinery Company, Chicago, Ill.

[22] Filed: June 18, 1973

[21] Appl. No.: 370,701

[52] U.S. Cl. .............................................. 177/123
[51] Int. Cl. .......................................... G01g 13/02
[58] Field of Search ................ 177/1, 116, 122, 123

[56] References Cited
UNITED STATES PATENTS
| | | | |
|---|---|---|---|
| 2,727,713 | 12/1955 | Kindseth et al. | 177/123 X |
| 2,763,457 | 9/1956 | Gregory | 177/122 X |
| 2,829,856 | 4/1958 | Gregory | 177/122 |
| 2,860,819 | 11/1958 | Weaver et al. | 177/122 X |
| 3,263,760 | 8/1966 | Waller | 177/116 X |
| 3,474,874 | 10/1969 | Pettis, Jr. | 177/122 X |
| 3,724,569 | 4/1973 | Blodgett | 177/116 X |
| 3,752,244 | 8/1973 | Rouban | 177/123 X |

Primary Examiner—George H. Miller, Jr.
Attorney, Agent, or Firm—Root & O'Keeffe

[57] ABSTRACT

A bulk weight servo control for automatically adjusting the bulk weight setting in the net weighing system of a packaging machine is disclosed, wherein corrective adjustment of an improper or erroneous bulk weight setting is made, in response to a detecting means which detects the fact that the bulk weight setting is in error. The detecting means may take any one of several forms. Preferably, the corrective adjustment may be made in response to the duration of the dribble feed, although it may also be made in response to a check weighing operation or to the time it takes to reach the bulk weight setting.

16 Claims, 3 Drawing Figures

FIG. I

BULK WEIGHT SERVO CONTROL FOR PACKAGING MACHINES

BRIEF SUMMARY OF THE INVENTION

The invention relates, generally, to weighing systems, and is directed, primarily, to a bulk weight servo control in such a system for automatically adjusting the bulk weight setting for greater accuracy in the final weight. The invention is particularly useful in the net weighing system of packaging machines and in such machines both bulk and dribble feeds of product into a weigh bucket are used. The dribble feed continues until the final desired weight is reached, at or after which time the product in the weigh bucket is dumped into a package.

In a typical cycle, the bulk feeding of product continues until some predetermined weight less than final weight has been reached, at which time the bulk feeding stops and dribble feeding begins, and continues until the system detects that final weight has been reached, whereupon dribble feed stops, the receptacle is emptied, and bulk feed begins again for the next cycle. In bulk feeding, product is fed at a much greater rate of feed than in dribble feeding.

For purposes of illustration, an example might be where the final weight desired is, say, 16 ounces, and the bulk feed proceeds until, say, 15 ounces is reached, at which time bulk feed stops and dribble feed begins and continues until the remaining 1 ounce has been fed. If final weight is to be greater, say 48 ounces, the bulk feed would continue for a longer period of time, and until, for example, 46 ounces is reached, and dribble feed would then proceed until the remaining 2 ounces had been fed. The invention herein is applicable to any desired final weight, and, while the description herein is directed, primarily to a final weight of 16 ounces, this is only by way of example, and for ease in understanding the invention and is not intended to be limited in any way.

The net weight of a package should not be less than that stated on the package, and in striving to stay above legal limits, it is important for economic reasons not to be excessively overweight, otherwise too much product is "given away." It is therefor advisable to attain a minimum of overweight.

During bulk feed, the scale of the weighing system will move rapidly, and when dribble begins, the scale will move more slowly. It is desirable to have the least amount of dribble time which will still allow the scale to adjust from the rapid to the slower movement, and which will accommodate other variables, such as material in suspension. It is difficult for an operator to establish the ideal bulk weight setting to achieve the ideal dribble time, because of the presence of the many variables. If the operator sets the bulk weight setting too high, for example equal to final weight, then the accuracy of final weight will be no better than the bulk weight accuracy. If the setting is too low, for example 13 ounces, then the dribble time, and, consequently the cycle time, is too long for practical purposes.

If circumstances were always ideal, there could be 15 ounces of bulk feed and 1 ounce of dribble feed, and the final weight would be consistently the desired 16 ounces, however bulk weight repeatability is poor, and thus the need for dribble feed. For a one ounce dribble feed, the poor repeatability of bulk weight will cause a variation in the amount of the dribble to be fed, for example from 0.8 ounce to 1.2 ounces. In most practical situations, it is possible to estimate this range of dribble weight variations within reasonable limits.

If the rate of dribble feeding is 1 ounce per second, and this remained constant, the range of dribble feeding time could also be predicted and could be expected to be between 0.8 second and 1.2 seconds. However, the rate of feeding dribble will also vary for any one of a number of reasons, such as voltage changes, product density changes and the like, and, therefore, the dribble feed rate is not always constant. On the other hand, these variations also have limits, and it is therefore possible to estimate limits on the time length of dribble feeding, for example 0.7 to 1.3 seconds.

Thus, in view of the foregoing, which cause variations in the final weight, there is a need for a bulk weight control. As mentioned above, the control of the bulk weight can be by corrective adjustment of the bulk weight setting being responsive to dribble time, or by check weighing the bulk weight, or by the bulk weight time. Check weighing is time consuming and bulk weight time is less accurate, and since a dribble time servo to control the bulk weight setting takes less time and is sufficiently accurate it is preferred and is made possible because of the strong correspondence between bulk weight and dribble time. Since the dribble time servo is preferred, it is this concept which will be described in detail here although it will be understood that the concept of bulk weight control is intended to embrace the other types of servo means.

More particularly, the invention may briefly be described as one wherein the detecting means for detecting an improper or erraneous bulk weight feeding, and operating a servo mechanism to impart a corrective adjustment to the bulk weight setting, is the dribble time.

It is therefore a principal object of the present invention to provide a bulk weight servo control, which will impart a corrective adjustment to the bulk weight setting, thereby producing optimum accuracy in the final weight without sacrificing cycle time.

Another object of the invention is to provide a bulk weight servo control which is responsive to dribble time, for imparting a corrective adjustment to the bulk weight setting.

A further and more specific object of the invention is to provide a bulk weight servo control which includes a timing means operable for a plurality of time periods, beginning with the weight of product reaching the bulk weight setting, and other means operable in response to termination of the dribble feed during a predetermined time period, to actuate a servo mechanism to increase or decrease the bulk weight setting.

Still another and more specific object of the invention is to provide a bulk weight servo control operable in response to dribble time, which functions to limit the duration of the operation of the corrective adjustment when increasing the bulk weight setting.

Another object is to provide a bulk weight servo control which will overcome the "oscillating accumulation" problem, which can occur when using an accumulator in the system.

Other objects will appear, more fully, as the description proceeds.

DETAILED DESCRIPTION OF THE PREFERRED EMBODIMENT

Figure 1:
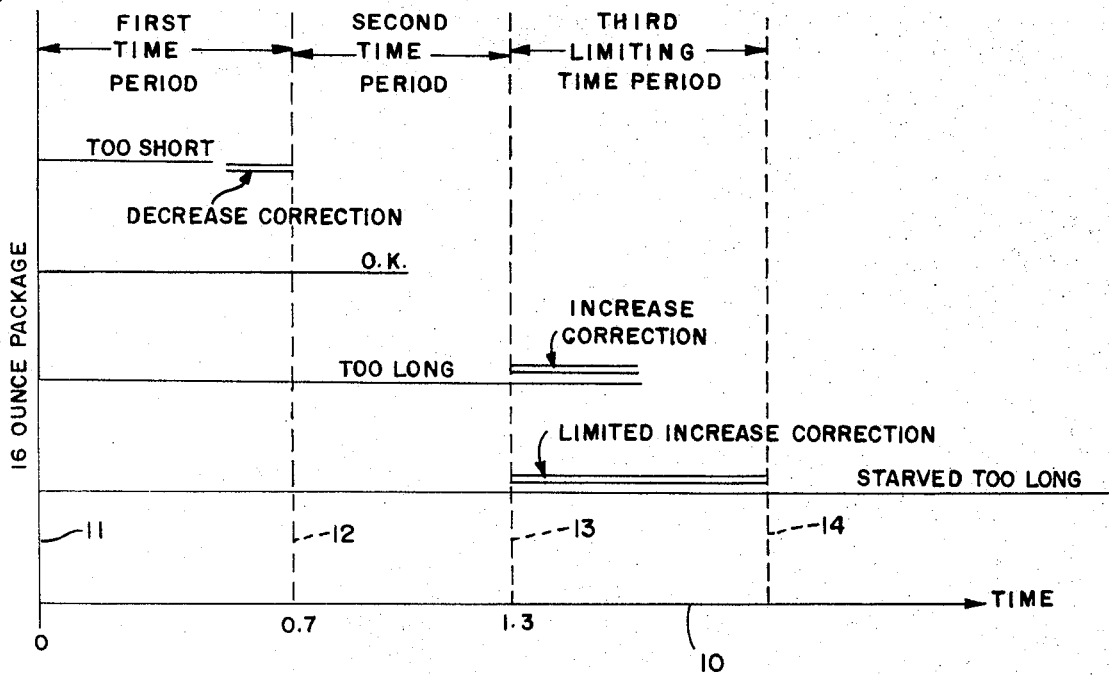
FIG. 1 is a diagram which illustrates, graphically, the operation of a servo control embodied in the present invention.

It should be mentioned, here, that there are two basic methods of feeding product to weigh bucket or receptacle in a packaging machine, where the product is dumped from the weigh bucket into a package. In both methods, there is a bulk feed and a dribble feed. In the one method, a setting is made for bulk weight, and when this weight is attained, the bulk feed will stop, and the dribble feed will start. The dribble feed continues until the final weight desired is reached, at which time the dribble feed will stop, and the product in the weigh bucket will be dumped into the package, whereupon the cycle will be repeated.

In the second method, a means to accumulate product is used. In this case, the bulk feed is not discontinued when the bulk weight setting is reached. Instead, after bulk weight is reached, the product from the bulk feed is accumulated while the dribble feed continues, and when the dribble feed stops, and the product in the weigh bucket is released, the product which has been accumulated will be released into the weigh bucket at the beginning of the next cycle. Bulk feed will then continue until bulk weight has been reached, whereupon the bulk feed will again be accumulated, and the dribble feed will proceed until final weight is reached. It will be understood that the term "accumulator" as hereinafter used is intended to embrace any and all apparatus used for accumulating product.

As will be illustrated in greater detail hereinafter, an unusual problem called "oscillating accumulation" can occur when product is accumulated, because of a serious misadjustment due to gross carelessness on the part of the machine operator. As will be seen, the present invention is also designed to overcome this problem.

In its simplest form, the bulk weight servo control of the present invention is operated in response to dribble time. If the dribble time is too short, this means that too much product has been fed during the bulk feed, and the servo control will then be operated to decrease the bulk weight setting. If the dribble time is too long, it means that insufficient product has been fed during the bulk feed, whereupon the servo control will be operated to increase the bulk weight setting.

There is also an intermediate condition where the dribble time is within the desirable limits thereof, indicating that the bulk weight setting is proper, whereupon no adjustment is needed, and the servo control will not be actuated.

The invention embodies timing means for the purpose of setting up two or more time periods. The first time period will begin weighing promptly when the system indicates that the bulk weight setting has been reached, and the second time period will begin at the end of the first time period. If the dribble feed stops during the first time period, this is an indication that the dribble feed time is too short, and a signal will be sent to the servo control which will then operate to decrease the bulk weight setting.

If the dribble feed stops during the second time period, signifying that the dribble time is within permissible limits, and that the bulk weight setting is proper, then either no signal will be sent or a "dribble time o.k." signal may be sent to suitable indicating means, if desired.

If the dribble feed continues, and does not stop until after termination of the second time period, it means that the dribble time is too long, and there is an insufficient amount of product in the weigh bucket at the end of the bulk feed, whereupon a signal will be sent to the servo mechanism to increase the bulk weight setting. If desired, a third time period can also be arranged to begin upon the termination of the second time period for the purpose of limiting the corrective increase in the bulk weight setting and turn off the servo in unusual situations where the feeder may become jammed or, for some other reason, the dribble feed of product is not reaching the receptacle.

The amount of the correction, in each instance, will be incremental, and the increment may be either fixed or proportional to the error of the bulk weight setting. In the preferred form of the invention, the corrective increment will be proportional to the error, thereby reaching the condition where the dribble time is within the satisfactory range thereof, more quickly, when the error in the bulk weight setting is relatively great.

Referring to the diagram of FIG. 1, the basic operation will become more apparent. Again, it is assumed that the final weight desired is 16 ounces, for purposes of illustration only. It has been indicated above, that the estimated variations in dribble feed time will have a lower limit of 0.7 second, and an upper limit of 1.3 seconds, where the average dribble feed time is intended to be 1 second. In the diagram of FIG. 1, the lower horizontal line, indicated by the numeral 10, indicates the length of time of dribble feed in seconds. The vertical line 11 is zero time, and the dash line 12 represents the end of the first time period, which is 0.7 second or the lower estimated limit of the dribble feed time.

The vertical line 13 indicates the end of the second time period, which is the upper estimated limit of the dribble feed time or 1.3 seconds. The vertical dash line 14 represents some predetermined third time period, after the lapse of the 1.3 seconds.

Reference to the logic diagram will illustrate the manner of operation of the control, but it will be evident from the diagram of FIG. 1, that if the dribble feed stops before the end of the first time period, which will be less than the minimum estimated lower time limit of 0.7 second, then the dribble time is too short, and there has been an excess of product fed to the receptacle by the bulk feed. This means that the bulk feed setting is too high, and should be decreased. The logic diagrams illustrate how this decrease correction of the bulk weight setting takes place by means of the servo control, in response to the stopping of the dribble feed during the first time period.

Since it has been estimated that the dribble feed time may vary from a lower limit of 0.7 second and an upper limit of 1.3 seconds, this will be the duration of the second time period or 0.6 second. If the dribble feed stops during, and before the end of, this second time period, this is an indication that the weight of the product in the receptacle is within allowable limits, and a correction of the bulk feed setting is not indicated. This is an "o.k." area then, indicating an "o.k." dribble feed time.

If the dribble feed continues beyond the upper estimated limit of time, or 1.3 seconds, there is an indication that there is insufficient product in the receptacle at the end of the bulk feed, whereupon the bulk weight setting may be increased. Thus, if the dribble feed continues beyond the end of the second time period, a signal will be sent to the servo control, calling for an increase in the bulk weight setting.

To provide for the usual situation where the feeder is jammed, or for some reason dribble feed is not reaching the receptacle so that final weight is not reached even after an unusually long time after the end of the second time period, then a further third timer can be added, which will function to limit the signal to increase the bulk weight setting thereby stopping the means to increase the bulk weight setting at the end of the third time period even though the dribbler feed is still "on."

Figure 2:
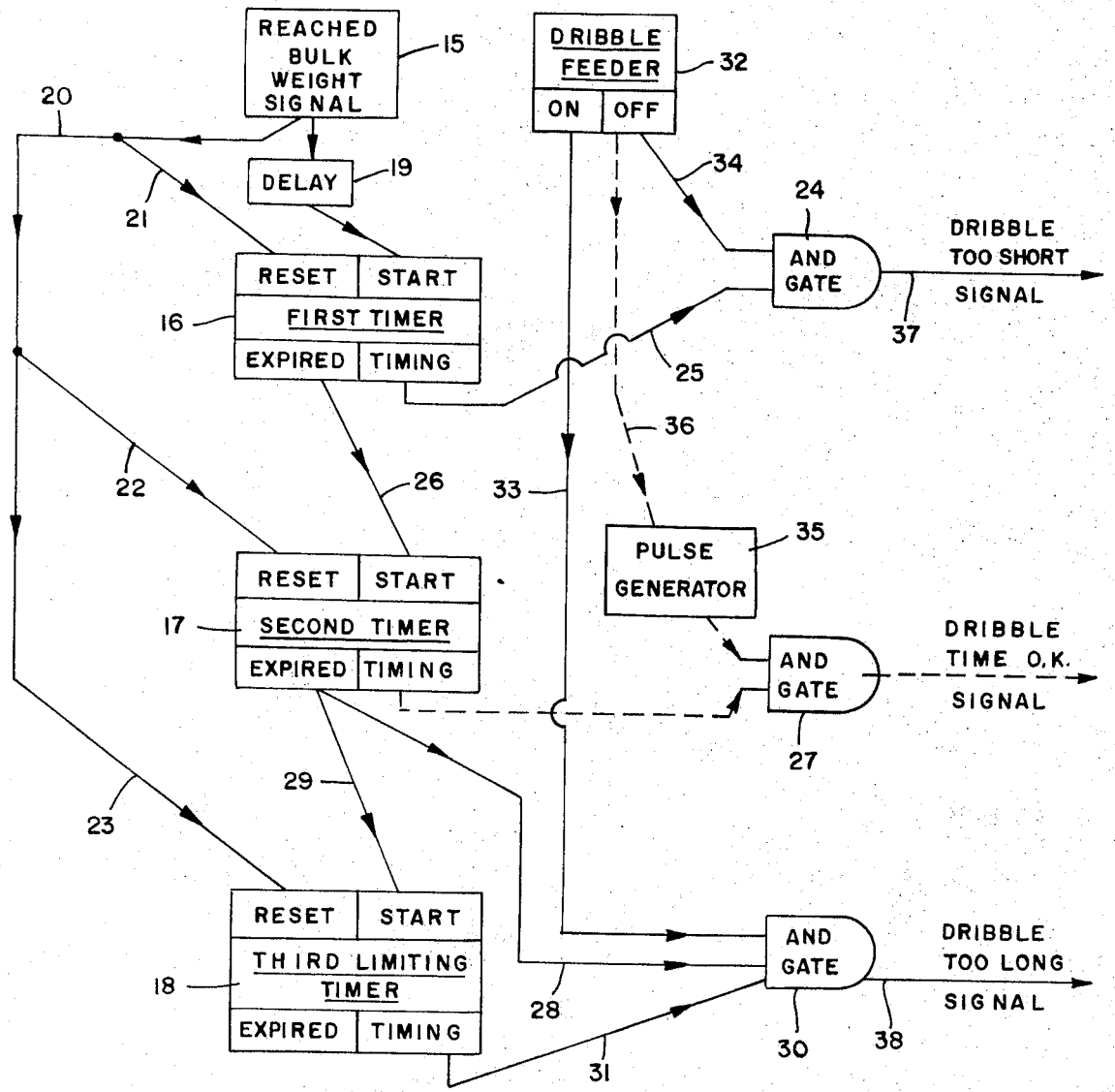
FIG. 2 is a logic diagram, illustrating one manner of determining whether the dribble feed time is too short, or within an area which is satisfactory (o.k.) or is too long.

Referring now, more particularly, to FIG. 2 and the logic diagram thereof, the logic symbol 15, labelled "reached bulk weight signal" is an electronic device which will emit signals when the product in the receptacle, which has been fed by the bulk feed, has reached the bulk weight setting. While timers may be used which are either overlapping or successive in their functions to provide successive time periods, we have disclosed herein, for purposes of illustration, timers which operate successively. Thus, the logic circuit shows a first timer 16 and a second timer 17. As mentioned heretofore, the circuit may also have a third timer 18.

Between the electronic device 15 and the first timer 16, there is a "delay" indicated at 19. When the bulk weight setting is reached, two signals will be put out, one to the "delay" timing device and the other will go to the first timer 16 to place it in its "reset" condition. This signal will also be put out to the second and third timers 17 and 18 to place them, likewise, in their reset condition. This may be noted in the logic diagram, where the signal from the logic device 15, represented by the circuit pathway 20 is carried to the first timer by the circuit pathway indicated by 21; to the second timer by the pathway 22, and to the third timer by the pathway 23. Thus, the first thing which occurs when bulk weight has been attained, is to place all of the timers in their "reset" condition, and, at the expiration of the delay period, which is extremely short (only long enough to allow the resetting of the timers) the delay timing device will send a signal to start the first timer for its timing period.

During this first period of time, while the first timer is timing, it is sending a signal to the AND gate 24, as may be indicated by the input pathway 25. At the end of the first time period, when the first timer reaches its "expired" state, a signal will be sent to the second timer 17 to start the second timer running. This may be noted in the logic diagram by means of the input pathway 26 extending from the "expired" portion of the timer to the "start" portion of the second timer.

During the second time period, while the second timer is timing, a signal will be emitted to the AND gate 27. At the end of the second time period, when the timer 17 has reached its "expired" condition, two signals will be emitted noted by the pathways 28 and 29. The pathway 28 carries an input signal to the AND gate 30. Pathway 29 carries a signal from the second timer to start the third timer timing if there is one.

If the third timer 18 is being used, then during its timing period, a signal will be emitted to the AND gate 30, as may be indicated by the pathway 31. The logic symbol 32 indicates the dribble feeder and the signals which may be emitted therefrom when the dribber feeder is in the "off" condition or in the "on" condition.

It will be evident from the diagram of FIG. 2 that when the dribble feeder is "on," it puts out a signal to the AND gate 30 by the pathway 33. In its "off" condition, the dribble feeder emits a signal which goes to the AND gate 24, as indicated by the pathway 34, and to the pulse generator 35 via the pathway 36.

To review for a moment, it will be noted that as soon as the bulk weight setting has been reached, all of the timers will immediately be reset, and after a short delay, the first timer will start its timing period. While the first timer is "on" and timing, a signal will be put out to the AND gate 24 via pathway 25. If, then, the dribble feeder stops and is in its "off" condition during the first time period, both the signal from the first timer and one resulting from the dribble feeder "off" condition will be received by the AND gate 24 and a single output signal will be emitted from the AND gate, indicating that the dribble feed time was "too short." This "too short" signal will be carried to the servo control, which will operate mechanically to cause a corrective adjustment to decrease the bulk weight setting so that during the next cycle, the bulk weight attained will be less.

If the dribble feed, on the other hand, continues byond the end of the first period, there will be no output signal from the AND gate 24, since both signals along the paths 25 and 34 must be present.

At the end of the first time period, when the first timer is in its "expired" state, an output signal is then emitted therefrom to start the second timer in accordance with the signal indicated by the pathway 26. During this second time period, a signal will be carried to the AND gate 27 from the second timer, and if there is no other signal there from the dribble feeder, no output signal will be present. On the other hand, if the dribble feeder should stop during the second time period, then a signal through the pathway 36 will be emitted to the pulse generator 35 which, thereupon, will send a pulse to the AND gate 27. If the signal from the second timer is present at the time the pulse reaches the AND gate from the pulse generator 35, then the output pulse signal will be emitted to indicate that the dribble time is satisfactory or "o.k."

At the end of the second time period, when the second timer is in its expired state, a signal will be emitted, as indicated by the pathway 28 to the AND gate 30. If the dribble feeder has previously stopped during the first or second time periods, then there will be no output signal from the AND gate 30. On the other hand, if a signal is present at the AND gate 30, by reason of the expired state of the second timer, and the dribble feeder is still on, then it will also carry a signal to the AND gate 30. At this point, the third timer is timing so that an output signal from the third timer is carried to the AND gate 30. When all three of these signals are present, then there will be an output signal from the AND gate 30, indicating the dribble is "too long" and such signal will thereupon activate the servo mechanism to increase the bulk weight setting.

If the third timer is not used, and the dribble feed is still "on" when the second timer is in its "expired" state, then only the two output signals from the dribble feed "on" condition and the second timer "expired" condition will be sufficient for an output signal to be emitted from a two-input AND gate in place of the gate 30, with the same result.

From the foregoing, it will be evident that we have provided a bulk weight setting, if necessary. When the dribble time is longer than it should be, in accordance with an estimated upper limit of time period, it is an indication that the bulk weight setting should be increased. If the dribble feed stops before it should, and prior to reaching the lower limit of the estimated proper time period, then it is an indication that the bulk weight setting should be decreased. As mentioned above, this corrective adjustment could be responsive to other specific conditions such as by bulk weight check weighing or by bulk weighing time, but we prefer to have it responsive to the dribble feed time.

Also, as heretofore mentioned, the corrective adjustment may not be sufficient to completely correct the error in the bulk weight setting, depending upon the amount of error in the setting. Thus, the adjustments made will be in increments, and such increments may be either fixed or proportional to the error. We prefer to make the adjustment proportional to the error because if the error is relatively great, the adjustment will likewise be relatively great, and the system will be brought back to its normal and proper operation in less time than if the corrective increments are always the same.

In the foregoing disclosure, therefore, when final weight is attained during the first time period, and the dribble feed stops, a corrective signal is sent to a servo motor or other suitable means operable to decrease the bulk weight setting. This corrective signal begins at the moment final weight is attached and continues for the remaining duration of the first time period. In this way, the correction will be equal to or proportional to the error.

Similarly, if final weight is not attained at the end of the second time period, a corrective signal is sent to the servo motor to increase the bulk weight setting. This corrective signal begins immediately at the end of the second time period, and continues until final weight is attained. Again, it will be seen that the correction is equal to or proportional to the error.

As mentioned above, also, the third timer may be added to limit this correction in the event that final weight should never be attained because of any one of a number of reasons, such as some malfunction of the machine, or feeder jam, or lack of any product in the supply hopper.

The foregoing disclosure describes the basic concept of the present invention in its simplest form. A variation of such system is in the use of an accumulator. The only difference between the two systems is that in this variation the bulk feeding is not discontinued when bulk weight is attained. Instead, the bulk feed continues to operate and a large portion thereof is merely accumulated in a suitable accumulator during the dribble feed time. At the beginning of the next weigh cycle, all of the accumulated product in the accumulator is placed in the weigh bucket immediately, and bulk feed continues to add product to the weigh bucket until the bulk weight setting has been reached. At this point, the dribble then starts again and the bulk feed continues to feed product into the accumulator.

The operation of such a weighing system may best be illustrated by the following detailed example, wherein, again, it is assumed that the final weight desired is 16 ounces; that the bulk feed rate is 8 ounces per second, and that the dribble feed weight is 1 ounce per second.

| | | | |
|---|---|---|---|
| Bulk feed rate | 8 oz/second | | |
| Dribble feed rate | 1 oz/second | | |
| Accumulated feed rate (bulk minus dribble) | 7 oz/second | | |
| Bulk weight setting | 15.00 ounces | | |
| Final weight | 16.00 ounces | | |
| CYCLE | ELAPSED TIME (Sec.) | AMOUNT IN BUCKET (Oz.) | AMOUNT IN ACCUMULATOR (Oz.) |
| First | 0.0 | 0.0 | 0.0 |
| | 1.0 | 8.0 | 0.0 |
| | 1.875 | 15.0 | 0.0 |
| | 2.875 | 16.0 | 7.0 |
| Second | 0.0 | 7.0 (from accum) | 0.0 |
| | 1.0 | 15.0 | 0.0 |
| | 2.0 | 16.0 | 7.0 |
| Third (and all following) | 0.0 | 7.0 | 0.0 |
| | 1.0 | 15.0 | 0.0 |
| | 2.0 | 16.0 | 7.0 |

Under normal operating conditions, even in the use of an accumulator, the system will operate in the same way to utilize a servo motor or some other suitable means operable to make a corrective adjustment in the bulk weight setting in response to a "dribble too long" signal or a "dribble too short" signal. In the logic diagram of FIG. 2, the output signal from the AND gate 24 follows the logic pathway 37. The output signal from the AND gate 30 is indicated by the pathway 38.

Figure 3:
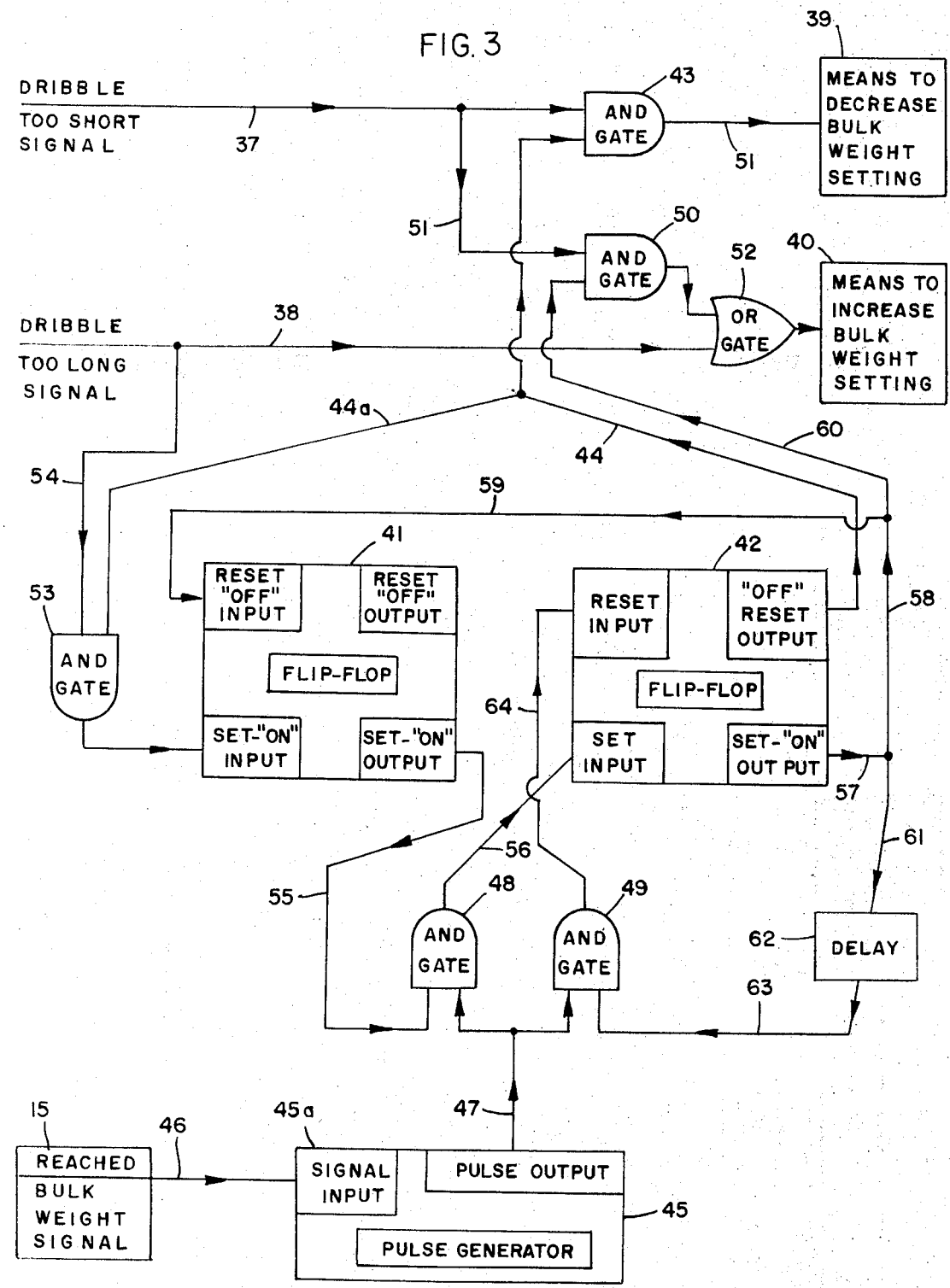
FIG. 3 is a logic diagram illustrating one form of circuitry which results in the decrease or increase of the bulk weight setting when the dribble time is either too short or too long, and illustrates also the manner of overcoming oscillation accumulation.

Referring now to FIG. 3, the upper part of the logic diagram may be considered to be a continuation of the diagram of FIG. 2 from the standpoint of indicating the means to decrease or increase the bulk weight setting. In the absence of an accumulator, the "dribble too short" signal indicated by the pathway 37 will be sent directly to the servo motor or other suitable means to decrease the bulk weight setting, indicated by the block 39.

Again, in the absence of an accumulator, when a "dribble too long" signal is emitted from the AND gate 30, as indicated by the pathway 38, it will be sent directly to the servo motor, or other suitable means, to increase the bulk weight setting, indicated by the block 40.

When an accumulator is used, an unusual problem becomes possible, and is normally referred to as "oscillating accumulation." This may occur when there has been a serious misadjustment of the bulk weight setting by lowering it excessively below the setting which it should have to obtain proper dribble time. This problem of "oscillating accumulation" may be explained by reference to the table which appears below and which is based upon the same figures as the example depicted above, except that, through some error, the bulk weight setting has been placed, for example, at 13 ounces for 16 ounces final weight. Assuming, again, that the bulk weight feed is at the rate of 8 ounces per second, and the dribble feed is at the rate of 1 ounce per second, then at the end of the first second of the cycle, there will be 8 ounces of product in the weigh bucket, and none in the accumulator. The bulk weight setting of 13 ounces will have been reached in 1.625 seconds, at which time the dribble feed will begin, and the bulk feed will be directing product to the accumulator. Since the bulk feed continues at the same rate, and the dribble feed continues at the rate of 1 ounce per second, it will become evident that it will require 3 seconds for the dribble feed to have reached final weight. During this three seconds, however, the bulk feed has been feeding product to the accumulator at the rate of 7 ounces per second, so that by the time final weight is reached in the weigh bucket, there will be 21 ounces of product in the accumulator.

At the beginning of the second cycle, this accumulated 21 ounces will be immediately placed in the weigh bucket, and since it is in excess of the final weight desired, there will be no dribble, and this accumulation of 21 ounces of product will be directed to the package.

The following table will illustrate what occurs under these conditions.

| CYCLE | ELAPSED TIME (Sec.) | AMOUNT IN BUCKET (Oz). | AMOUNT IN ACCUMULATOR (Oz.) |
|---|---|---|---|
| First | 0.0 | 0.0 | 0.0 |
|  | 1.0 | 8.0 | 0.0 |
|  | 1.625 | 13.0 | 0.0 |
|  | 4.625 | 16.0 | 21.0 |
| Second | 0.0 | 21.0(from accum) | 0.0 |
| Third & all odd | 0.0 | 0.0 | 0.0 |
|  | 1.625 | 13.0 | 0.0 |
|  | 4.625 | 16.0 | 21.0 |
| Fourth & all even | 0.0 | 21.0 | 0.0 |

From the foregoing explanation, it will be evident that the "oscillating accumulation" problem would defeat a dribble time control of bulk weight if it were to operate only according to the techniques described above, inasmuch as the servo would alternately increase and decrease the bulk weight setting with no net change.

In order to overcome this "oscillating accumulation" problem, the logic circuitry will be modified to the extent shown in FIG. 3.

The same logic circuitry, as shown in FIG. 2, including the timers will be retained. In addition, we have a switching circuit and also have a memory circuit which is activated by a "dribble too long" signal. The memory will remember this long dribble from the weigh cycle during which the long dribble occurred, until the end of the following weigh cycle, at which time the memory is "reset" as will become evident shortly. The switching circuit serves the purpose of converting what normally would be a correction for a short dribble into a correction for a long dribble, whenever the memory circuit is activated.

Referring now to FIG. 3, there are indicated two flip flop devices, thereby creating a two-cycle memory. The one flip flop device is indicated by the numeral 41 and the other is indicated at 42. Both of the flip flops are normally in their "reset" state.

In the "reset" state of flip flop 41, in the diagram illustrated, no signal will be emitted from its "set" output. When flip flop 42 is in its "reset" state, however, an output signal will be sent to the AND gate 43 via the logic pathway 44.

In the lower part of the diagram, there is indicated a pulse generator 45. When the bulk weight setting has been reached, a signal will be sent to the signal input 45a of the pulse generator 45 via the logic pathway 46. This will create a pulse output via the logic path 47 to the two AND gates 48 and 49.

Under these conditions, if the bulk weight setting is too high, a "dribble too short" signal will be sent to the AND gate 43, as well as to the AND gate 50 via the logic pathway 51. As long as the flip flop devices are in their "reset" state, there will be a signal at the AND gate 43, and when a "dribble too short" signal is received by the AND gate 43, an output signal will be emitted to the means 39 via logic pathway 51 to decrease the bulk weight setting.

If, however, during the first cycle the bulk weight setting is too low and a "dribble too long" signal is emitted, it will be sent to the OR gate 52 via the logic path 38, and such signal will also be sent to the AND gate 53 via the logic pathway 54. A signal will be present on pathway 44a from the "reset" output of flip flop 42. This will cause the AND gate 53 to put out a signal to the "set" input of flip flop 41, thereby causing an output signal from the "set" output to the AND gate 48 via the logic path 55.

Previously, during this same first cycle, when the bulk weight setting was reached, the pulse generator 45 emitted a pulse output to both of the AND gates 48 and 49. Later in this same cycle, if an output signal from flip flop 41 is sent to AND gate 48, nothing will happen because the pulse from generator 45 is no longer present.

When final weight is reached and the product is dispensed to the package, the second cycle will begin. The flip flop 42 is still in its reset state, and flip flop 41 is still in its set state and its output signal will still be present at the AND gate 48. During this second cycle, when the bulk weight setting has been reached, and an output pulse is sent to AND gate 48, the presence of the signal from flip flop 41 will cause a signal to be emitted via logic path 56 and received by the "set" input of flip flop 42. This promptly emits a signal from the "set" output of flip flop 42 which has three logic paths.

This output signal, indicated by the logic path 57, is carried via the logic paths 58 and 59 to the reset input of flip flop 41, thereupon resetting the device, and there will no longer be any output signals therefrom.

The "set" output signal from flip flop 42 will also be sent to the AND gate 50 via the logic paths 58 and 60. This signal will also be transmitted via logic path 61 to the "delay" device 62, and, after a short delay (long enough to permit the pulse output from generator 45 to be completed) from there to the AND gate 49 via the logic path 63.

When the final weight is again reached in the second cycle, the product will be dispensed and the third cycle will commence with the flip flop 41 "reset" and the flip flop 42 in its "set" state. A signal will be present at AND gate 49 and at AND gate 50.

During the second cycle, if the dribble feed time is too long, then, the signal to the OR gate 52 will cause an output signal to activate the means 42 to increase the bulk weight setting. If, on the other hand, the dribble feed time is too short, the switching circuit will be utilized to convert this signal, as though it were a "dribble too long" signal, and activate the means to increase the bulk weight setting. This occurs because the flip flop 42 is in its "set" state, whereupon no signal will be present at the AND gate 43. Thus, a "dribble too short" signal will not create an output signal from this gate. Instead, the signal will be sent to the AND gate 50, via the logic path 51 where there is already present a signal, which has been sent by the "set" output of flip flop 42. This causes an output signal to be emitted from AND gate 50 to OR gate 52 and, thereupon, will activate the means 40 to increase bulk weight setting.

During the third cycle, when the bulk weight setting has been reached, the pulse output from the generator 45 will again be sent to the AND gates 48 and 49, but since there is no signal present at gate 48 from flip flop 41, nothing will happen. However, there will be a signal present from the set output of flip flop 42, through the delay 62 and to AND gate 49, so that when the signal from the pulse generator 45 is received, an output signal will be transmitted to the reset input of flip flop 42 via logic path 64.

At this point in the third cycle, both flip flops will be in their "reset" state, and if the dribble is too short, a signal will be sent to the AND gate 43, where there is already present a signal from the "reset" output of flip flop 42 and the means to decrease the bulk weight setting will be activated.

If, however, during this third cycle the dribble time is too long, the result will be the same as that which occurred during the first cycle, where the "dribble too long" signal will be sent to the OR gate 52 to activate the means to increase the bulk weight setting. The signal will also be sent to the AND gate 53 to "set" the flip flop 41, and the cycle will be repeated, as described above, with respect to the first cycle.

It will thus be evident that in a system using an accumulator the present invention will eliminate the problem of "oscillating accumulation" by raising the bulk weight setting until proper dribble time is achieved.

Changes may be made in the form, construction and arrangement of parts, from those disclosed herein, without in any way departing from the spirit of the invention or sacrificing any of the attendant advantages thereof, provided, however, that such changes fall within the scope of the claims appended thereto.

We claim:

1. In a weighing system for accurately weighing product fed to a receptacle, wherein said system is provided with bulk and dribble feeds for the product, and wherein said dribble feed has a predetermined desired time period or weight with tolerances, a bulk weight setting, a final weight setting, and means for stopping bulk feed to the receptacle and starting dribble feed at a predetermined bulk weight setting, apparatus for controlling the weight of product fed by the bulk feed to the receptacle during operation of the system, comprising detecting means for detecting a bulk weight setting which causes the dribble time or weight to fall outside of said tolerances, and a servo mechanism operable to impart automatically a corrective adjustment to the bulk weight setting in response to said detecting means when detecting a bulk weight setting which causes dribble time or weight to fall outside of said tolerances.

2. The combination of elements defined in claim 1, wherein said detecting means includes timing means operable in response to the bulk weight of product reaching the bulk weight setting, and other means, operable in response to termination of the dribble feed during a predetermined time period, to actuate said servo mechanism.

3. The combination of elements defined in claim 1, wherein said detecting means includes timing means operable for a plurality of time periods beginning with the start of the dribble feed, and other means operable in response to termination of the dribble feed during a first time period to actuate said servo mechanism to decrease the bulk weight setting.

4. The combination of elements defined in claim 1, wherein the corrective adjustment to the bulk weight setting is proportional to the amount of the dribble time or weight which is outside of said tolerances.

5. The combination of elements defined in claim 1, wherein said detecting means includes timing means operable for a plurality of time periods beginning with the start of the dribble feed, and other means operable in response to continuation of the dribble feed beyond a predetermined time period subsequent to the first time period to actuate said servo mechanism to increase the bulk weight setting.

6. The combination of elements defined in claim 4, wherein said time periods are successive.

7. In a weighing system for accurately weighing product fed to a receptacle, wherein said system is provided with bulk and dribble feeds for the product, a bulk weight setting and means for stopping bulk feed to the receptacle and starting dribble feed at a predetermined bulk weight setting, a final weight setting with a predetermined time period with tolerances for the dribble feed to be performed, apparatus for controlling the weight of product fed by the bulk feed to the receptacle during operation of the system, comprising a first timer operable for a first time period in response to bulk weight reaching the bulk weight setting, a second timer operable for a second time period, a servo mechanism operable automatically to impart a corrective adjustment to increase or decrease the bulk weight setting when such setting is in error causing the dribble feed period to fall outside the tolerances, and means to initiate operation of said servo mechanism to decrease the bulk weight setting when the dribble feed stops during the first time period.

8. The combination of elements defined in claim 7, wherein operation of said second timer is initiated in response to termination of said first time period.

9. The combination of elements defined in claim 7, wherein said last named means continues to operate said servo mechanism until termination of said first time period, whereby the magnitude of said corrective adjustment will be proportional to the error of the bulk weight setting.

10. The combination of elements defined in claim 7, wherein said last named means operates said servo mechanism for a predetermined time period, whereby the magnitude of said corrective adjustment will be a predetermined set increment.

11. The combination of elements defined in claim 7, including a second-means to initiate operation of said servo mechanism to increase the bulk weight setting when the dribble feed continues after termination of said second time period.

12. The combination of elements defined in claim 8, wherein said second means continues to operate said servo mechanism until final weight is attained, whereby the magnitude of said corrective adjustment will be proportional to the error of the bulk weight setting.

13. In a weighing system for accurately weighing product fed to a receptacle, wherein said system is provided with bulk and dribble feeds, a bulk weight setting, a final weight setting, and means for stopping bulk feed to the receptacle and starting dribble feed at a predetermined bulk weight setting, a fixed time period with tolerances for the dribble to reach final weight setting, apparatus for controlling the weight of product fed by the bulk feed during each cycle of operation of the system, comprising, a servo mechanism operable to increase or decrease said bulk weight setting in response to an error in bulk weight setting causing the dribble feed period to fall outside the tolerances, means for transmitting a signal to said servo mechanism during a cycle when the bulk weight setting is too low, for actuating said servo mechanism to increase the bulk weight setting, and means for transmitting a signal to said servo mechanism during a cycle when the bulk weight setting is too high, for actuating said servo mechanism to decrease the bulk weight setting.

14. The combination of elements defined in claim 13, wherein said servo mechanism is activated in response to dribble feed time, and wherein said first named signal is a "dribble too long" signal and said second named signal is a "dribble too short" signal.

15. The combination of elements defined in claim 14, combined with means to convert a "dribble too short" signal into a "dribble too lone" signal whenever it occurs in a cycle immediately following one in which a "dribble too long" signal occurred.

16. The combination of elements defined in claim 15, wherein said means to convert comprises a memory which remembers a "dribble too long" signal, and switching means controlled by said memory to divert a "dribble too short" signal to the servo mechanism which increases the bulk weight setting.

* * * * *

UNITED STATES PATENT OFFICE
CERTIFICATE OF CORRECTION

Patent No. 3,837,415          Dated September 24, 1974

Inventor(s) Connors and Klopfenstein

It is certified that error appears in the above-identified patent and that said Letters Patent are hereby corrected as shown below:

Column 1, line 45 "therefor" should be --therefore--.

Column 5, line 15, "may" should be --must--.

Column 6, line 15, "dribber" should be --dribble--.

Column 11, line 56 "thereto" should be --hereto--.

Column 12, line 34 "4" should be --5--.

Signed and sealed this 3rd day of December 1974.

(SEAL)
Attest:

McCOY M. GIBSON JR.
Attesting Officer

C. MARSHALL DANN
Commissioner of Patents